Feb. 3, 1942.   W. R. DRAY   2,272,148
CONTROLLABLE AIR SUPPLY FOR CLEANERS OF THRESHERS AND THE LIKE
Original Filed July 1, 1935
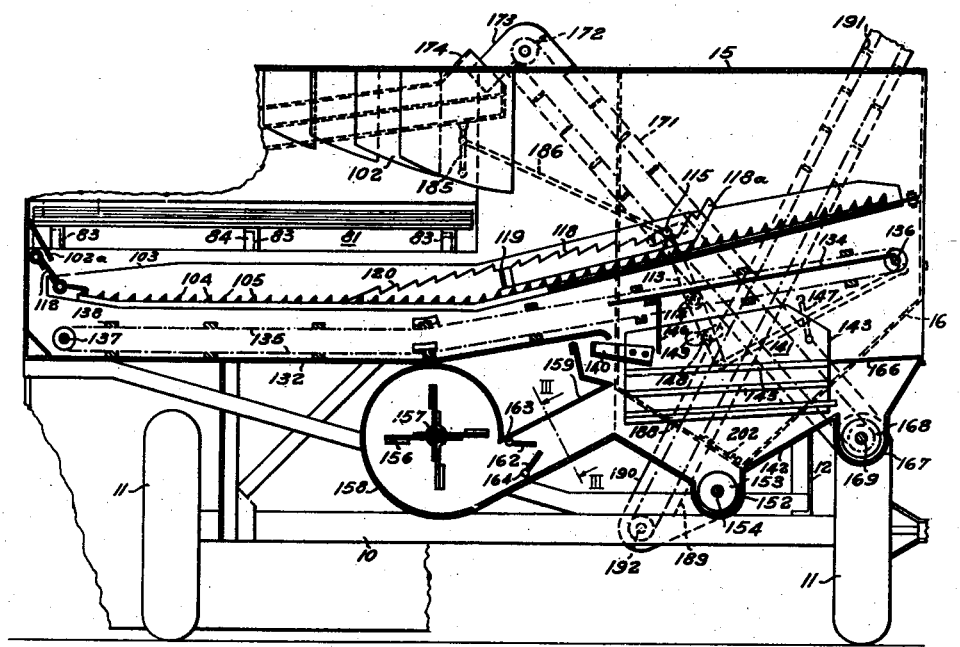

Patented Feb. 3, 1942

2,272,148

UNITED STATES PATENT OFFICE 2,272,148

CONTROLLABLE AIR SUPPLY FOR CLEANERS OF THRESHERS AND THE LIKE

Walter R. Dray, Kendall Township, Kendall County, Ill., assignor to Allis-Chalmers Manufacturing Company, Milwaukee, Wis., a corporation of Delaware Original application July 1, 1935, Serial No. 29,216. Divided and this application June 29, 1940, Serial No. 343,128

9 Claims. (Cl. 209—154)

This invention relates in general to improvements in apparatus for supplying a controllable volume of air for application to the cleaning of threshed grain or seeds in a thresher or harvester-thresher, or for like purposes.

The present application is a division of applicant's copending application, Serial No. 29,216, filed July 1, 1935.

In known types of apparatus, such as threshers and harvester-threshers, it is customary to provide an air fan or blower driven from some operating mechanism of the apparatus, to furnish a supply of air to a cleaning device, usually of the shaking screen type, for the purpose of floating or blowing dust and the lighter chaff out of the grain during the cleaning operation. It is highly desirable that this air supplied to the cleaning device be of uniform pressure across the full width of the cleaning device in order to prevent eddying and whirling or channeling of the air, effects which hinder the satisfactory cleaning of the grain. The required volume or pressure of air for most efficient cleaning of the grain on the cleaning screens, so as not to blow away and waste any grain, but still remove a maximum of dust and lighter chaff which would otherwise pass through the screens, will vary with conditions, such as the character of the crop, moisture, the amount of dust and chaff in the grain, and the direction and velocity of the wind, where the apparatus is operated out of doors, as in the case of a harvester-thresher or a stationary thresher.

Certain of the prior art devices for furnishing a controllable supply of air for cleaning purposes provide a controlling valve in the passage from the fan or other source for supplying air to the cleaning device, so as to vary the amount of air supplied to the cleaning device; but these controlling valves have heretofore been such that, while capable of controlling the volume of air, nevertheless, they introduce, at least when partly open, undesirable effects of eddying and whirling and channeling of the air in the discharge passage, and do not permit uniformity of distribution of air and the pressure thereof throughout the full cross section of the discharge passage beyond the valve, i. e., the air supplied to the cleaning device. And this uneven distribution of air to the various parts of the cleaning device produces insufficient and unsatisfactory cleaning of the grain or seed.

The present invention contemplates the provision of an adjustably controlled supply of air or the like for use in connection with or application to the cleaning of grain in a threshing or harvester-threshing machine and like purposes. The desired results are best attained in accordance with the present invention by providing a controlling valve device in the conduit from a source of air supply, this valve being of such design that the volume of air supplied from the source may be varied between a maximum and minimum, while at the same time insuring that the air in the discharge conduit beyond the valve, which is supplied to the grain cleaning device or the like, is at the desired uniform pressure throughout the full cross section of the discharge conduit, rather than channeling or eddying along one or both side portions or an intermediate portion of the conduit. And the operating result of utilizing this design of controlling device in the conduit supplying air to a grain cleaning device is to provide a stream of air sweeping across the cleaning device at a desired uniform and controllable pressure throughout the full width of the cleaning device.

It is an object of the present invention to provide an improved design and construction of apparatus for supplying a controlled volume of air for cleaning threshed grain in a separating mechanism of a threshing machine, or like purpose, and one wherein the volume of air may be controlled between maximum and minimum values and at the same time be supplied in a stream of uniform pressure throughout the full cross section of the air supply passage.

It is a further object of this invention to provide an improved design and construction of controlling apparatus of this character, including an air supply conduit having a controlling valve device associated therewith and operative in its various controlling positions between maximum and minimum open conditions to insure that the air in the conduit at the discharge side of the device is of substantially uniform pressure throughout the full cross sectional area of the air stream with the valve device in any of its positions of adjustment.

It is a further object of this invention to provide an improved design and construction of controlling apparatus of the above character wherein the valve device includes a plurality of cooperative pivoted valve elements within the supply conduit and which in the various partial open positions of the valve device define a passage one dimension of which is substantially equal to the corresponding dimension of the conduit and a second dimension, at right angles to the first dimension, which is greater than one-half of the corresponding dimension of the conduit.

It is a further object of this invention to provide a novel design and construction of controlling apparatus of the above character wherein the valve device comprises a plurality of pivoted leaf elements having cooperative edge portions of deeply indented outline and so arranged that the indentations of each valve element may be substantially closed by the intermediate projections or teeth formed by the indentations of the other valve element, the opening through the cooperative valve elements extending throughout substantially the full extent of one dimension of the conduit and a major portion of another dimension of the conduit, at right angles to the first dimension, throughout the full range of control of the valve device from maximum to minimum open conditions thereof.

These and other objects and advantages are attained by the present invention, various novel features of which will be apparent from the description and accompanying drawing, disclosing an embodiment of features of the invention, and will be more particularly pointed out in the claims.

In the accompanying drawing:

Fig. 1 is a fragmental vertical sectional view of a harvester-thresher including a grain cleaning device with air control therefor embodying features of the present invention;

Fig. 2 is a fragmental view in elevation of a portion of the apparatus of Fig. 1; and Fig. 3 is a sectional view in the plane of the line III—III of Fig. 1.

Referring to the drawing, wherein there are shown parts of a harvester-thresher, such as is disclosed in the above mentioned parent application, a main support for the apparatus may be in the form of a steel tube 10 extending transversely of the normal direction of travel of the apparatus, and carrying journals for the supporting and traction wheels 11. On the support 10 is mounted a supporting framework carrying a supporting and enclosing housing for the threshing mechanism and a housing 15 for the separating mechanism, the latter communicating with the discharge side of the housing for the threshing mechanism and extending transversely thereof. A grain storage bin 16 may be mounted on the frame forwardly of the separator housing 15.

A rotatable cylinder, indicated generally at 81, comprises a plurality of spaced annular members or disks 83 with peripheral flanges thereon turned over at right angles to the planes of the disks, as indicated at 84. Secured to the peripheral flanges 84 of the disks 83 are a plurality of spaced thresher bars 85, preferably in the form of sections of angle iron, one flange portion of each bar being secured to the flanges 84 of the disks 83 and the other substantially radially extending flange portions of the thresher bars serving as the active threshing elements of the cylinder. The threshing bars of the cylinder cooperate, during rotation of the latter, with the threshing elements of a stationary concave disposed below and in relatively close proximity to the cylinder.

The stalks and the threshed grain removed therefrom by the action of the threshing mechanism are forced rearwardly, across the full width of the threshing cylinder and housing therefor, into a separator housing 15, through the adjacent wall thereof; and the straw and grain are discharged from the cylinder housing with considerable force, due to relatively high speed of the cylinder and the fan effect thereof.

In order to maintain the separating mechanism of minimum length and to insure utilization of the separating action of the latter throughout its full length, one or more guiding baffles 102 curving toward the forward end of the separator housing are shown mounted on and depending from the roof of the separator housing into the path of material projected upwardly and rearwardly from the threshing cylinder. These baffles 102 preferably extend to gradually increasing distances tranversely of the separating chamber, and may be of gradually increasing height, toward the discharge end of the separator housing, in order to secure the desired baffling and guiding effect. The material discharged from the cylinder housing strikes these baffles and is guided thereby toward the forward end of the separator housing and drops down on the adjacent end portion of the separating mechanism, permitting utilization of the separating action of the latter on the straw throughout the full length of the separator.

The forward end wall of the separating housing 15 may be provided with a transversely extending baffle 102a extending across substantially the full portion of the width of the housing and extending downwardly at an angle. This baffle 102a serves to deflect onto the forward end of the separating mechanism grain and straw particles projected against the forward end wall, thus preventing pieces of straw from passing downwardly between the end of the rack and the adjacent wall of the separator housing. This baffle 102a may be mounted on a portion of this end wall which is hinged or otherwise removably secured in position, so as to permit, on removal of the detachable portion, inspection of the rack and discharge portions of the threshing cylinder housing.

The separator housing 15 is provided with devices for shaking the straw and recovering threshed grain therefrom, these devices including a straw shaking rack extending the full length and approximately the full width of the separator housing. The straw rack includes a frame 103, comprising longitudinal side members and connecting bars at the ends thereof, and is of dimensions approximating the inner dimensions of the separator housing.

This rack is provided with a series of spaced slats extending transversely of the length of the housing and carried by the frame 103. As indicated, these slats are arranged in two series, the slats 104 of one series alternating with the slats 105 of a second series.

The rack is mounted in operative position to provide for the desired oscillating or shaking motion through a link or set of links 112 pivoted to the forward end of the frame 103 and the end wall of the separator housing, and through oscillating shaking arms or levers 113, one at each side of the separator housing, mounted on journal pins 114 carried by the housing. The upper ends of these shaking levers 113 are connected to pins 115 on the outer side walls of the frame 103 and passing through arcuate slots 116 in the side walls of the housing. With the rack mounted or swung on the rear supporting links 112 and the upper ends of the shaking arms 113, the rack as a whole is given the desired vibrating or shaking motion through oscillation of the shaking arms 113.

In order to augment the normal separating action of the straw rack, auxiliary shaking devices are provided, in the form of a plurality of longitudinally extending and spaced shaker arms 118, these arms being disposed above and adjacent the upper surface of the rack slats, and preferably slightly spaced from the latter, the upper edges of these arms being serrated in such fashion as to assist in advancing any straw resting thereon toward the discharge end of the separator housing, and the arms being inclined toward each other in the direction of travel of the straw. The discharge ends of the shaker arms are preferably provided with upwardly extending tail-like projections 118a, the raised discharge ends of these projections being considerably spaced from the body of the straw rack so that as the straw is moved over these extensions, it is free to drop through space onto the body of the rack.

These shaker arms 118 have a lateral motion across the rack about pivotal points, in a fashion corresponding to the movement of a fish's tail. As indicated, the shaker arms are pivoted or hinged, as indicated at 119, to the forward edges of bars or arms 120 secured to certain of the transverse slats or bars carried by the rack frame. The upper edges of these bars 120 are inclined upwardly gradually from the level of the upper surfaces of the rack slats to the level of the rear edge of the upper surface of the shaker arms 118.

The desired sidewise oscillation of the shaker arms 118 may be secured through suitable actuating mechanism not disclosed herein.

In the normal operation of the apparatus straw and grain threshed therefrom, through the action of the threshing mechanism, are fed or blown by the latter into the separator housing, being deposited upon the forward end thereof. Through the normal shaking action of the rack, this straw and grain are advanced rearwardly along the rack, that is, in the direction of discharge from the separator housing, the grain, along with relatively short pieces of straw falling through the spaces between the rack slats as the straw is advanced. The straw advancing along the rack through the normal oscillatory movement thereof, or at least the greater portion of the straw, will advance or ride upon the serrated upper edges of the supporting bars 120 and the pivoted shaker arms or fish-tails 118. Through this riding up and advancement of the straw along the shaker arms, there is less tendency toward matting down of the straw on the rack in such a manner as to impede the passage of threshed grain or seeds through the straw. The straw continues to advance over the pivoted shaker arms and the rack and to the discharge end of the rack, and it is forced over the discharge end directly into the field or is conveyed through a suitable rigid or flexible conveyer to a desired point of discharge.

During operation of the straw rack, threshed grain and some chaff dropping through the spaces between the slats 104, 105, fall onto the bottom plate 132 of the separator housing, and onto a plate 134 secured to the side walls of the housing adjacent the discharge end thereof. A grain drag or rake 135 of conventional design is provided within the separator housing below the straw rack, this drag or rake including a pair of endless chains one at each side of the housing and passing over driving sprockets on a driving shaft 136 and over sprockets at the front end of the housing mounted on a shaft 137, with spaced transverse raking bars 138 extending between and connecting the chains.

The sprockets for the grain drag are so disposed relative to the bottom wall 132 of the separator housing and the plate 134 that the upper course of the drag brushes over the upper surface of the plate 134 and the lower course of the drag brushes over the upper surface of the bottom wall 132 of the housing. Hence, grain falling on the plate 134 is carried forwardly along the plate by the movement of the grain drag and drops off the forward edge of the plate, all or a portion falling onto the rear edge of the bottom wall 132 of the housing. And all of the grain falling onto the bottom wall 132 of the housing is carried by the drag to the rear edge of the bottom wall where it is brushed off into a discharge pan or chute 140 whence it is free to discharge by gravity to a fanning or cleaning device 141.

The cleaning device 141 may be of the fanning mill type and is disposed in a housing 142 depending from the separator housing and open to the latter housing below the plate 134. The cleaning device comprises a frame 143 in which is mounted a plurality of superposed and spaced and preferably removable screens 145 whose normal position is such that the discharge ends of the screens are inclined upwardly to a slight extent from the horizontal plane. Grain and short pieces of straw passing through the rack flow from the discharge chute 140 onto the forward portion of the upper screen, a depending baffle 146 mounted at the under side of the plate 134 being disposed beyond the discharge end of the chute 140 to prevent material from being blown or thrown toward the discharge end of the screen.

The cleaning device is suspended through one or more links 147 pivotally attached to the rear portion of the frame 143 and the side walls of the housing and pins 148 on the sides of the frame passing through arcuate slots 149 in the housing and pivotally mounted in bearing portions 150 on the shaking arms or levers 113. As the shaking arms 113 oscillate during operation, this oscillatory or shaking motion is imparted, through the pins 148, to the cleaning device and the screens thereof. Through the shaking motion of the screens, threshed grain passes through one after another of the superposed screens, falling onto the bottom wall of the housing 142, the latter constituting a grain receiving pan having portions sloping downwardly toward the center to a well 152 which constitutes the casing or housing for a transversely extending screw conveyer 153.

Ventilating means are provided for assisting in the separating and cleaning action of the cleaning device. This ventilating or air supplying means includes a fan 156 of conventional form mounted on a shaft 157 and disposed within a casing 158 integral with or carried by the separator housing. The inlet to the fan is in an axial direction, i. e., through the ends of the casing, and the discharge is substantially tangential through a conduit or passage 159 of substantially rectangular cross section discharging into the housing 142 of the cleaning device at the forward ends of the screens. The discharge from the fan is controllable as to volume of air passed therethrough by a valve device disposed in the discharge passage.

This valve device is the form of two complementary wickets or leaves 162 fixed on operating shafts or spindles 163, 164 adjacent the upper and lower edges of the passage. These wicket valve sections 162 may be of sheet metal suitably secured on their operating shafts, and in closed position they lie in substantially the same plane transversely of the discharge passage, with the space between the meeting edges of the wickets substantially closed, generally as shown in Fig. 3 wherein the wickets are indicated as being in almost fully closed position. These wickets are movable to an open position substantially at right angles to closed position; and in this open position, the wickets are disposed substantially parallel to the upper and lower walls of the discharge passage. The two wickets may be actuated simultaneously to desired position through meshing gear segments 163a and 164a on the shafts 163 and 164 and a suitable common actuating lever.

The adjacent edges of the wickets which substantially meet each other in closed position are of deeply indented outline to provide a serrated or tooth formation, and the teeth of both wickets are of the same shape and size and with the teeth of one wicket alternating with those of the other wicket. As the wickets move from fully closed position, an opening of extended zigzag formation, indicated at 165 in Fig. 3, is formed, providing for the passage of air over a limited but linearly extended area across the full width of the discharge passage and across almost the full height of this passage; and as the wickets are moved toward fully open position, the effective opening continues to extend across the full width and substantially the full height of the passage.

This arrangement provides that under all partly open conditions of the controlling valve device, air is discharged from the fan to the cleaning device throughout an area extending across the full width of the discharge passage and substantially the full height of the passage, the effect of this arrangement being that there are no adverse effects from eddy currents that might result from ordinary forms of valve control, and the air in the discharge passage beyond the controlling valve readily assumes the condition of a body of air of uniform pressure throughout the full cross section of the discharge portion of the passage, this pressure being dependent upon the degree of valve opening. And the fact that this uniform flow of air is available at any desired pressure, dependent upon the degree of valve opening, insures most beneficial results in the cleaning of the grain.

During the operation of the apparatus and under the effect of the shaking motion of the cleaning screens and the current of air discharged by the fan 156 across the screens, dust and dirt are blown away through the discharge from the separator housing, and the clean grain passes through the screens. The larger particles of straw and unthreshed grain heads pass over the rake 166 extending from the rear edge of the upper shaking screen to the discharge from the separator housing. Most of the unthreshed or partly threshed heads are recovered by reason of these heavier particles dropping through the tines of and from the rake into the housing 167 of the screw conveyer 168 having an operating shaft 169, the lighter straw particles and chaff being carried, through the shaking motion and under the influence of the air blast, to the discharge from the separator housing.

As the threshed grain drops through the several superposed screens, the shaking action thereof, in conjunction with the air blast, is effective to carry any grain bearing tailings over the rear edge of the screens whence they drop into the casing of conveyer 168.

The opposite end of the conveyer housing 167 communicates, at the farther side of the separator housing, with the housing 171 of an inclined bucket elevator or conveyer 172, in the form of a flexible belt or chain passing over a driving pulley or sprocket mounted on the end of the shaft 169 of the conveyer 168 and over a sprocket or pulley mounted at the upper end of the elevator housing 171.

The upper end of the elevator housing is provided with a discharge spout 173 which discharges material to the feed inlet 174 of a secondary cleaning device comprising a longitudinally extending housing in front of the separator housing. The secondary cleaner, or recleaner, is mounted on oscillating links, indicated at 185, so as to permit shaking the recleaner device by a pitman rod 186 connected to a link 185 and the shaking lever 113, at the connection 115.

The grain falling into the housing 152 of the conveyer 153 is conveyed through the latter and through a suitable extension thereof, preferably formed beneath or integral with the inclined bottom wall 188 of the grain receiving bin 16, the grain discharging into the lower end of the housing 189 of a bucket or like elevating conveyer 191, the grain receiving well portion thereof, indicated at 190, being disposed at the forward edge of the bin 16 and supported by the bottom of the bin. The body portion of the conveyer housing is preferably arranged within and supported by the bin, and the upper end of the housing of the elevating conveyer is preferably provided with a suitable spout arrangement for discharging the grain to the bin or other receptacle. This conveyer is actuated by a driving shaft 192.

Power for operating the various mechanisms of the apparatus may be derived from a power source or shaft suitably supported on the frame and which may be connected in driving relation to the shaft 154 of the screw conveyer 153.

Power is supplied from the rear end of the shaft 154, through a drive, indicated in Fig. 2, including a V-belt 240 cooperating with a V-pulley 241 on the shaft 154, a V-pulley 242 on the shaft 169 of the conveyer 168, a V-pulley 243 on the shaft 157 of the fan 156 and a V-pulley 245 on the driving shaft 136 of the grain drag 135, this driving connection serving to drive the conveyer 168 and the driving pulley or sprocket of the elevating conveyer 172, the fan 156, and the grain drag, all in the desired direction of rotation, with but one crossing turn, indicated at 247, of the belt. An adjustable idler pulley 248 is mounted on the side wall of the separator housing and serves to establish the desired driving tension on the belt 240; and through an operating lever 249 on which the shaft of idler pulley 248 is mounted, the tension of the belt may be adjusted or wholly relieved, as when the apparatus is to be out of operation for some time.

The shaft 136 is provided at each end thereof with an eccentric connection to pitmans 251, one at each side of the separator housing, the other end of these pitmans being connected to the lower ends of the shaker arms 113 which impart the desired shaking movement to the grain rack and the cleaning device 141, and, through the pitman rod 186, to the secondary cleaner. The sheave 245 may be used as a portion of one of these eccentric connections to the adjacent pitman 251.

The elevating conveyer 191 in the grain bin is driven by a V-pulley or sprocket 254 on the driving shaft 192 of the conveyer and drivingly connected to a corresponding pulley or sprocket 256 on the forward end of the drive shaft 154.

The diameters of the various driving and driven pulleys are so selected as to give the desired normal speeds of rotation to the driven shafts. Further adjustment of the speeds of the individual driven shafts may be secured through the use of V-groove pulleys of known design wherein provisions are made for adjusting the width of the space between the side walls of the belt groove, thus permitting the driving belt to sink to variable distances in the groove and thereby providing at will a considerable range of effective pitch diameters of the sheaves.

It should be understood that features and operating effects of the invention disclosed hereinabove have definite commercial applications and utility other than in the particular apparatus described or in the specific combinations with various other features defined in the claims, and the invention is to be considered as embracive of these various applications and utilities. And it is not desired that the invention be limited to the exact details of construction shown and described herein for obvious modifications may occur to persons skilled in the art.

It is claimed and desired to secure by Letters Patent:

1. In a threshing apparatus, a device wherein threshed grain is cleaned through removal of dust and like material therefrom, and means for supplying a controllable current of air to said cleaning device and comprising a conduit through which said air passes to said cleaning device, and adjustable valve means in said conduit operative to vary the effective area of a portion of the air passage while insuring the passage of said air through said valve means over an area extending throughout a major portion of one dimension of the conduit and at least one-third of the full distance of the dimension of said conduit at right angles to said first dimension even when the effective opening provided through said valve means is a minimum, said valve means comprising cooperative members one of which is movable toward and away from the other, said members having cooperative edge portions of deeply indented outline to form spaced teeth thereon, with the teeth of one member substantially closing the spaces between the teeth of the other member when said valve means is in a position to substantially fully obstruct the passage of air through the conduit.

2. In a threshing or like apparatus, a device for supplying a controllable current of air for cleaning or like purpose and comprising a conduit through which the air passes, and adjustable valve means for said conduit operative to vary the amount of air passing through said valve means while insuring the passage of the air therethrough over an area extending throughout substantially the full distance of one dimension and with intermediate portions of said area extending throughout a major portion of the full distance of another dimension at right angles to said first dimension of said conduit even when the opening provided through said valve means is reduced to a minimum, said valve means comprising cooperative members one of which is swingable on a pivotal axis toward and away from the other, and said members having cooperative edge portions of deeply indented outline to form spaced teeth thereon, with the teeth of one member substantially closing the spaces between the teeth of the other member when said valve means is in a position to substantially fully obstruct the passage of air through said valve means.

3. In a threshing apparatus, a device for cleaning grain separated in said apparatus, and ventilating means for supplying a controllable current of air to said cleaning device and comprising a conduit through which said air passes to said cleaning device, and adjustable valve means in said conduit operative to vary the amount of air passing therethrough and comprising a pair of pivoted members swingable on spaced axes toward and from each other to vary the effective area of the air passage between said members, the opposing edges of said members being deeply serrated, with the serrations of one member substantially closing the spaces between serrations of the other member when said members are in position to substantially close the air passage through said valve means, and means for simultaneously actuating said valve members toward open and closed positions.

4. In a threshing or like apparatus, a device for supplying a controllable current of air for cleaning or like purposes, comprising a conduit through which said air passes, and adjustable valve means in said conduit operative to vary the amount of air passing therethrough and comprising a pair of pivoted members swingable toward and from each other on spaced substantially parallel axes to vary the effective area of the air passage between said members, the opposing edges of said members being serrated to a depth greater than one-third of the dimension of said member at right angles to its pivotal axis with the serrations of one member substantially closing the spaces between serrations of the other member when said members are in position to substantially close the air passage through said valve means, and means for actuating said valve members toward open and closed positions.

5. In a threshing apparatus, a mechanism for cleaning grain separated in said apparatus, said cleaning mechanism comprising a screening device, and ventilating means for supplying a controllable current of air across said screening device and comprising a conduit through which said air passes to said screening device, and adjustable valve means in said conduit operative to vary the amount of air passing therethrough and comprising a pair of pivoted members swingable on parallel axes on opposite sides of the passage through said conduit and movable about said axes toward and from each other to vary the effective area of the air passage, the opposing edges of said members being serrated, with the serrations of one member substantially closing the spaces between serrations of the other member when said members are in position to substantially close the air passage through said valve means, and the serrations of each member being of a depth greater than one-half of the distance between the pivotal axes of said member, and means for simultaneously actuating both said valve members.

6. In a threshing or like apparatus, a device for supplying a controllable amount of air comprising a plurality of cooperative valve elements adjustable toward and from each other in an air passage or conduit, said valve elements having cooperative edge portions of deeply indented outline with the indentations of one valve element so disposed with respect to the indentations of the other valve element that they may be substantially closed by the projections or teeth formed by the indentations of said other valve element, and the opening through the valve elements between the cooperative edges thereof extending throughout substantially the full extent of one dimension of the passage established by the valve elements when in full open position and at least one-third of another dimension of such passage at right angles to such first dimension throughout the full range of control of the valve elements from maximum to minimum open condition thereof, whereby the body of air on the discharge side of the valve device is caused to be of substantially uniform pressure throughout its full cross section independently of the degree of adjustment of the controlling device.

7. In a threshing apparatus, a mechanism for cleaning grain separated in said apparatus, said cleaning mechanism comprising a screening device, and ventilating means for supplying a controllable current of air across said screening device and comprising a conduit through which said air passes to said screening device, and adjustable valve means in said conduit operative to vary the effective area of a portion of the air passage therethrough and comprising a pair of pivoted members swingable on parallel axes on opposite sides of the passage through said conduit and movable about said axes toward and from each other to vary the effective area of the air passage, the opposing edges of said members being serrated, with the serrations of one member substantially closing the spaces between serrations of the other member when said members are in position to substantially close the air passage through said valve means, and the serrations of each member being of a depth greater than one-half of the distance across said conduit, and means for causing simultaneous operation of both said valve members toward and from open position.

8. In a threshing or like apparatus, a device for supplying a controllable current of fluid through a conduit for cleaning or like purpose and comprising a valve means including a plurality of valve elements associated with the conduit and swingable on pivotal axes toward and from each other, the free edges of each of said valve elements being deeply serrated to provide spaced teeth of a width tapering toward the free edges of the valve element, and the teeth of one valve element being opposite the spaces between adjacent teeth of the cooperative valve element and effective to substantially close said spaces when the valve means is in minimum open position.

9. In a threshing or like apparatus, a device for supplying a controllable current of fluid through a conduit for cleaning or like purpose and comprising a valve means including a plurality of valve members associated with the conduit, one of said valve members being movable toward and from closed position relative to another valve member, cooperative edge portions of each of said valve members being deeply serrated to provide spaced teeth of a width tapering toward the free edge of the valve member and a depth greater than one-third of the dimension of the conduit at right angles to the direction of the depth of the teeth when said valve members are in closed position, and the teeth of the one valve member being opposite the spaces between the teeth of the other valve member and effective to substantially close said spaces when the valve means is in substantially fully closed position.

WALTER R. DRAY.